(12) United States Patent
Gowdappa et al.

(10) Patent No.: US 10,866,930 B2
(45) Date of Patent: Dec. 15, 2020

(54) MIGRATING LOCK DATA WITHIN A DISTRIBUTED FILE SYSTEM

(71) Applicant: Red Hat, Inc., Raleigh, NC (US)

(72) Inventors: Raghavendra Gowdappa, Bangalore (IN); Pranith Kumar Karampuri, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 684 days.

(21) Appl. No.: 15/083,795

(22) Filed: Mar. 29, 2016

(65) Prior Publication Data

US 2017/0286445 A1 Oct. 5, 2017

(51) Int. Cl.
*G06F 16/00* (2019.01)
*G06F 16/176* (2019.01)
*G06F 16/11* (2019.01)
*G06F 16/182* (2019.01)

(52) U.S. Cl.
CPC ........ *G06F 16/1774* (2019.01); *G06F 16/119* (2019.01); *G06F 16/183* (2019.01)

(58) Field of Classification Search
CPC ......... G06F 17/30171; G06F 17/30203; G06F 17/30079; G06F 16/1774; G06F 16/183; G06F 16/182; G06F 16/119
USPC ........................................................ 707/704
See application file for complete search history.

(56) References Cited

U.S. PATENT DOCUMENTS

| | | | | |
|---|---|---|---|---|
| 5,956,712 A | * | 9/1999 | Bennett | G06F 16/1774 |
| 6,026,474 A | * | 2/2000 | Carter | G06F 9/5016 |
| | | | | 711/202 |
| 7,120,631 B1 | * | 10/2006 | Vahalia | G06F 16/1774 |
| 7,844,584 B1 | * | 11/2010 | Griess | G06F 17/30171 |
| | | | | 707/668 |
| 7,933,991 B2 | * | 4/2011 | Ganesh | G06F 16/1774 |
| | | | | 709/225 |
| 8,117,244 B2 | | 2/2012 | Marinov et al. | |
| 8,209,307 B2 | | 6/2012 | Erofeev | |
| 8,458,239 B2 | | 6/2013 | Ananthanarayanan et al. | |
| 8,601,220 B1 | * | 12/2013 | Corbin | G06F 3/0617 |
| | | | | 711/111 |
| 8,805,889 B2 | | 8/2014 | Preslan et al. | |
| 9,208,167 B1 | * | 12/2015 | Henderson | G06F 16/178 |
| 9,514,165 B2 | * | 12/2016 | George | G06F 17/303 |

(Continued)

OTHER PUBLICATIONS

Raghavendar, G, "[Gluster-Devel] Lock Migration as a Part of Rebalance", http://www.gluster.org/pipermail/gluster-devel/2015-July/045999.html, Jul. 2, 2015, 4 pages.

(Continued)

*Primary Examiner* — Jean M Corrielus
(74) *Attorney, Agent, or Firm* — Lowenstein Sandler LLP

(57) ABSTRACT

Systems and methods for migrating locking data for a file system object within a distributed file system. An example method may comprise: initiating a transfer of locking data from a first node of a distributed file system to a second node of the distributed file system, wherein the locking data is associated with a file system object and comprises a connection identifier indicating a connection between a client requesting a lock and the first node; constructing a modified connection identifier that indicates a connection between the client and the second node; and updating the second node to include the locking data with the modified connection identifier.

20 Claims, 5 Drawing Sheets

(56) References Cited

U.S. PATENT DOCUMENTS

| | | | |
|---|---|---|---|
| 9,697,227 B2* | 7/2017 | Aron | G06F 17/30168 |
| 9,984,095 B2* | 5/2018 | George | G06F 16/1774 |
| 2008/0243847 A1* | 10/2008 | Rasmussen | G06F 17/30171 |
| 2009/0112965 A1* | 4/2009 | Ganesh | G06F 16/1774 |
| | | | 709/201 |
| 2009/0119304 A1* | 5/2009 | Preslan | G06F 17/30067 |
| 2010/0114889 A1* | 5/2010 | Rabii | G06F 16/1824 |
| | | | 707/737 |
| 2012/0011176 A1 | 1/2012 | Aizman | |
| 2012/0259820 A1* | 10/2012 | Patwardhan | G06F 16/1774 |
| | | | 707/674 |
| 2014/0122718 A1* | 5/2014 | Thoppai | H04L 67/1097 |
| | | | 709/225 |
| 2014/0136502 A1* | 5/2014 | Mohamed | G06F 9/52 |
| | | | 707/704 |
| 2015/0106411 A1* | 4/2015 | Avati | G06F 16/182 |
| | | | 707/827 |
| 2015/0213011 A1* | 7/2015 | George | G06F 17/303 |
| | | | 707/802 |
| 2016/0117336 A1* | 4/2016 | Aron | G06F 17/30168 |
| | | | 707/688 |
| 2016/0139854 A1* | 5/2016 | Erofeev | G06F 16/1774 |
| | | | 711/128 |
| 2017/0004083 A1* | 1/2017 | Jain | G06F 12/0817 |
| 2017/0177612 A1* | 6/2017 | George | G06F 16/119 |
| 2017/0351701 A1* | 12/2017 | Aron | G06F 17/30168 |

OTHER PUBLICATIONS

Darcy, Jeff, "Using GlusterFS for Filesystem Migration", http://pl.atyp.us/wordpress/index.php/2010/06/using-glusterfs-for-filesystem-migration/, Jun. 15, 2010, 3 pages.

"Linux NFS Requirements for Cluster File Systems and Multi-Protocol Servers", http://www.citi.umich.edu/projects/cluster_nfsv4/google+citi-semiannual-report.pdf, 2 pages.

"Cloud Storage for the Modern Data Center", http://moo.nac.uci.edu/~hjm/fs/An_Introduction_To_Gluster_ArchitectureV7_110708.pdf, 2011, 21 pages.

* cited by examiner

MIGRATING LOCK DATA WITHIN A DISTRIBUTED FILE SYSTEM

TECHNICAL FIELD

The present disclosure generally relates to distributed file systems for storing file system objects and locking data for the file system objects, and more specifically relates to migrating locking data within the distributed file system.

BACKGROUND

Modern computers may include file systems that support file locks and store files on multiple different storage devices. The file system may transfer files between storage devices to distribute the storage load across the multiple different storage devices. When transferring files, the file system may move a file by transferring the file's content without transferring the file locks associated with the file. Instead, the file system may notify the client and have the client to re-acquire the file lock after the file is moved.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
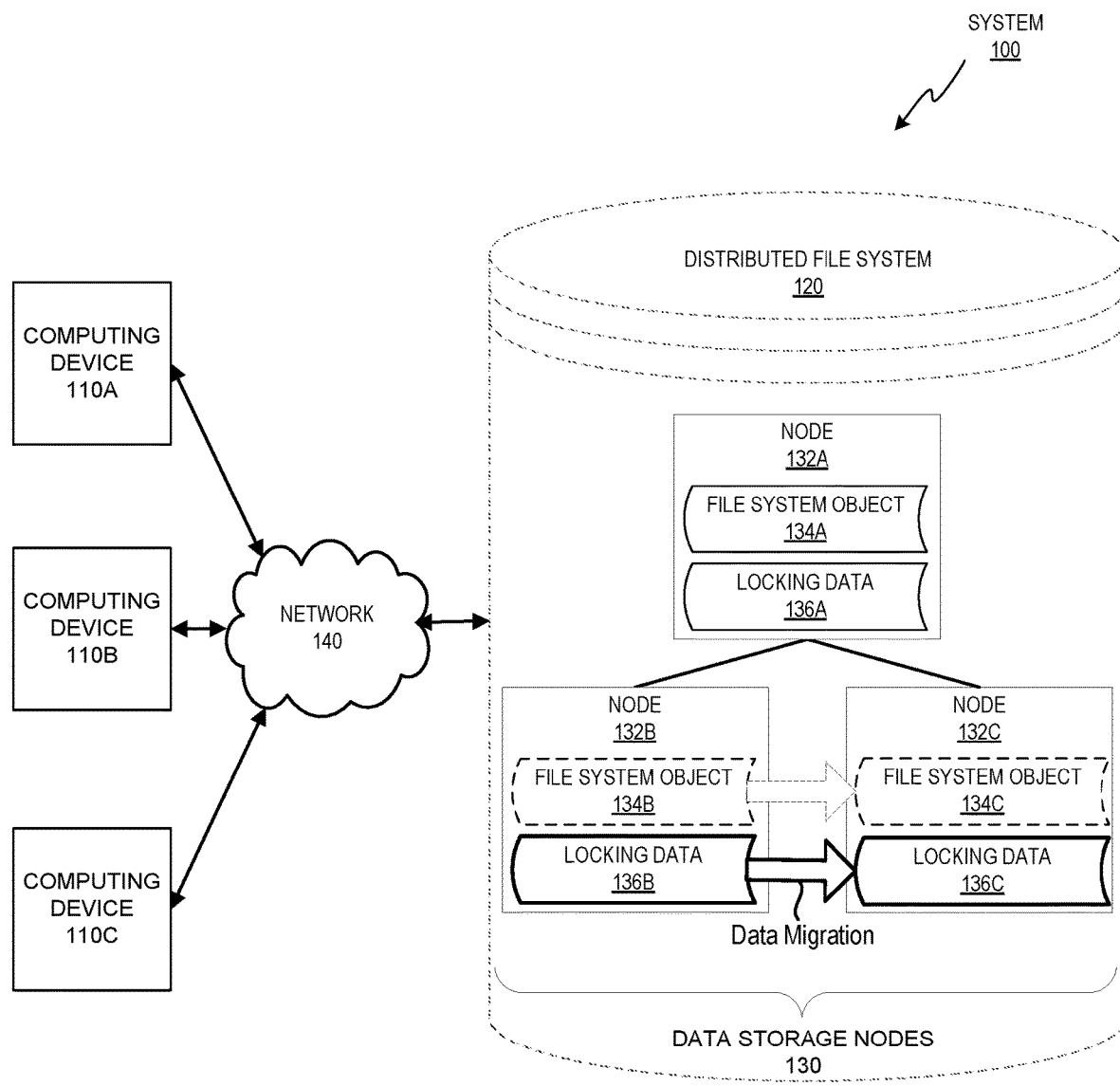
FIG. 1 depicts a high-level diagram of an example system architecture in accordance with one or more aspects of the present disclosure.

Described herein are methods and systems for migrating locking data within a distributed file system. The distributed file system may span one or more nodes and each of the nodes may be connected directly or indirectly with one or more other nodes. Some or all of the nodes may store file system objects and locking data for the file system objects. The files system objects may include files, portions of files, directories, metadata, or a combination thereof. The locking data may be used to restrict access to the file system objects and may include a lock state (e.g., unlocked, locked, blocked), a lock owner (e.g., application process), a connection identifier (e.g., client connection) or a combination thereof. The connection identifier may be associated with a client from which a lock request was received and may include a portion that identifies a connection to the client and a portion that identifies a process running on the client (e.g., distributed file system client process).

The distributed file system may optimize the distribution of data across the nodes by migrating file system objects and locking data between nodes. The locking data may be associated with a lock request that has been granted (e.g., granted lock) or a lock request that has been blocked and is waiting to be granted (e.g., blocked lock). The file system objects and locking data may be stored on the same node and may be stored in different manners or at different locations. In one example, the file system objects may be stored on disk and the locking data may be stored in the memory of a process providing access to the files system object (e.g., export process). When performing a migration procedure, the distributed file system may migrate the file system object and locking data consecutively or concurrently. Migrating the locking data may involve acquiring a guard that functions as a lock on the locking data and prevents changes to a lock state (e.g., unlocked, locked) during the migration. During the migration of the locking data, the distributed file system may modify the locking data to update the connection identifier and replace information associated with the previous node with information associated with the new node. When migrating a blocked lock, the migration procedure may determine the request path for the lock request that is blocked. The request path may include identification information that identifies one or more node modules (e.g., node processes) that forwarded the lock request to the original node. The migration process may replace the identification information associated with the original node with information associated with the new node.

The migration procedure may be performed by a rebalancing process (e.g., daemon) that is running on a node within the distributed file system. Some or all of the nodes may have a rebalancing process that may determine when the node can benefit from rebalancing the file system objects and locking data across one or more of the nodes. For example, rebalancing process may initiate a migration when a node is added to, or removed from the distributed file system or when the storage space of a node changes. The migration may move file system objects and associated locking data without involving the client application processes that have locks on the file system objects.

Systems and methods described herein include a distributed file system that is capable of migrating locking data associated with granted and blocked locks between nodes of the distributed file system. Traditional distributed file systems may transfer files to different machines without transferring file locks or blocked file locks associated with the transferred files. Traditional distributed file systems may ignore an existing lock and inform the client process to reacquire the lock after the file has been transferred. An advantage of the technology disclosed herein is that it may support the migration of locking data for both granted locks and blocked locks between nodes of a distributed file system. Various aspects of the above referenced methods and systems are described in details herein below by way of examples, rather than by way of limitation.

FIG. 1 illustrates an example system 100, in accordance with an implementation of the disclosure. The system 100 may include computing devices 110A-C, a distributed file system 120, data storage nodes 130, and a network 140. Network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

Computing devices 110A-C may include client devices or server devices that communicate with distributed file system 120 to access file system objects and obtain locks on the file system objects. Computing devices 110A-C may have one or more connections with one or more nodes 132A-C. The connection may be an indirect connection with a node or a direct connection with a node. An indirect connection with a node may include a combination of one or more communication channels that pass through an intermediate node. For example, an indirect connection between computing device 110A and node 132B may involve a first communication channel between computing device 110A and node 132A and a second communication channel between node 132A and node 132B. A direct connection is one in which a computing device 110A has a communication channel between itself and a node without traversing an intermediate node.

Distributed file system 120 may span multiple data storage nodes 130 and may be accessed by computing devices 110A-C by traversing one or more networks. Data storage nodes 130 may be capable of storing data for the distributed file system 120 and may function together to create, store, and move file system objects and locking data. Each of the data storage nodes 130 may correspond to a region of storage space (e.g., volume, sub-volume, partition) and may be arranged in a hierarchical manner such that node 132A may provide access to a volume of data storage and nodes 132A and 132B may each provide access to a portion of the volume (e.g., sub-volume). Nodes 132A-C may be associated with the same computing device or may each be associated with one or more different computing devices. In one example, nodes 132A-C may be located on the same computing device and each of nodes 132A-C may be associated with a separate computing process that manages its portion of storage space. In another example, nodes 132A-C may each be located on a separate computing device (e.g., node device) that is connected with one or more of the other node devices.

Each of the separate computing devices may be capable of participating in a distributed file system and may be a client device (e.g., desktop, laptop, and tablet), server device (e.g., server of a cluster), data storage device (e.g., Network Attached Storage (NAS) or Storage Area Network (SAN)) or other computing device. Data storage nodes 130 may each contribute data storage resources, data processing resources or a combination thereof. In one example, all of the nodes may provide data storage resources and data processing resources for distributed file system 120. In another example, one or more of the nodes may provide data processing resources to manage other nodes without providing data storage resources to store file system objects for distributed file system 120.

Distributed file system 120 may have decentralized file system management, centralized file system management or a combination of both (e.g., hierarchical). A decentralized file system management may include a file system that has more than one node (e.g., all nodes) managing the data storage activities of data storage nodes 130. A centralized file system management may include a distributed file system where one of the nodes manages the data storage activities of some or all of the other nodes. Distributed file system 120 may also have a partially centralized and partially decentralized management. For example, there may be an arrangement that includes multiple nodes in a hierarchical arrangement (e.g., tree or star storage topology) such that a top-level node manages mid-level nodes and the mid-level nodes manage lower-level nodes. A simplified hierarchical arrangement is illustrated in FIG. 1 in regards to nodes 132A-C.

Nodes 132A-C may each be associated with one or more computing processes (e.g., daemons, services) that manage storage related activity for the node. The computing processes may include, for example, a storage sharing process (e.g., export process), a storage access process (e.g., mount process), a storage management process (e.g., rebalance process), or a combination thereof. The storage sharing process may be a server process that provides a remote computing device access to storage space. Storage sharing process may support any data transfer technology such as to Network File System (NFS), Common Interconnected File System (CIFS), or other data transfer technology. The storage access process may be a client process that interacts with one or more storage sharing processes to retrieve data from a storage space located over a network. The storage management process may involve one or more a client or server processes that handle migrating file system objects 134A-C and locking data 136A-C between nodes, which may help balance the distribution of data between one or more nodes 132A-C.

File system objects 134A-C may include file objects, directory objects and other information used by distributed file system 120 to store, manage, or organize data. Each file system object 134A-C may include content (e.g., file data), metadata (e.g., inode), or a combination thereof. The metadata may include one or more attributes or extended attributes such as identifiers (e.g., GUID, UUID), names (e.g., file name, directory name), permissions (e.g., read, write execute), type (e.g., file type), ownership, creation time, or other attributes. A file object may be a data structure that organizes data and identifies portions (e.g., locations) within a data store that store the corresponding data. A directory object may be a data structure for cataloging one or more files and directories (e.g., subdirectories). Directories may be the same or similar to folders or catalogs and may be arranged in a hierarchical manner such that there are parent directories and child directories. A directory object may be associated with a layout that identifies files or directories within the directory object. The directory layout may include a reference pointer (e.g., link to file, symbolic link) that points to one or more files within the same storage space (e.g., sub-volume) or a different storage space. One or more of the file system objects may be associated with locking data 136A-C.

Locking data 136A-C may be used to prevent or restrict access to one or more file system objects. Locking data 136A-C may be arranged as entries or elements and each element of locking data (e.g., locking data 136A) may correspond to a granted lock or blocked lock on a file system object. As shown in FIG. 1, each of the file system objects 134A-C may be associated with an element of locking data. In other examples, a file system object may be associated with one or more elements of locking data and each element of locking data may correspond to a different lock owner or potential lock owner (e.g. blocked lock). In further examples, one or more files system objects may correspond to the same locking data and indicate a single lock owner has locked the file system objects. The locking data and the corresponding file system object may both be associated with the same node and may therefore be stored on the same device and both migrated to a different node (e.g., node 132C). The components of locking data 136A-C and the migration of locking data 136A-C will be discussed in more detail in regards to FIG. 2.

Figure 2:
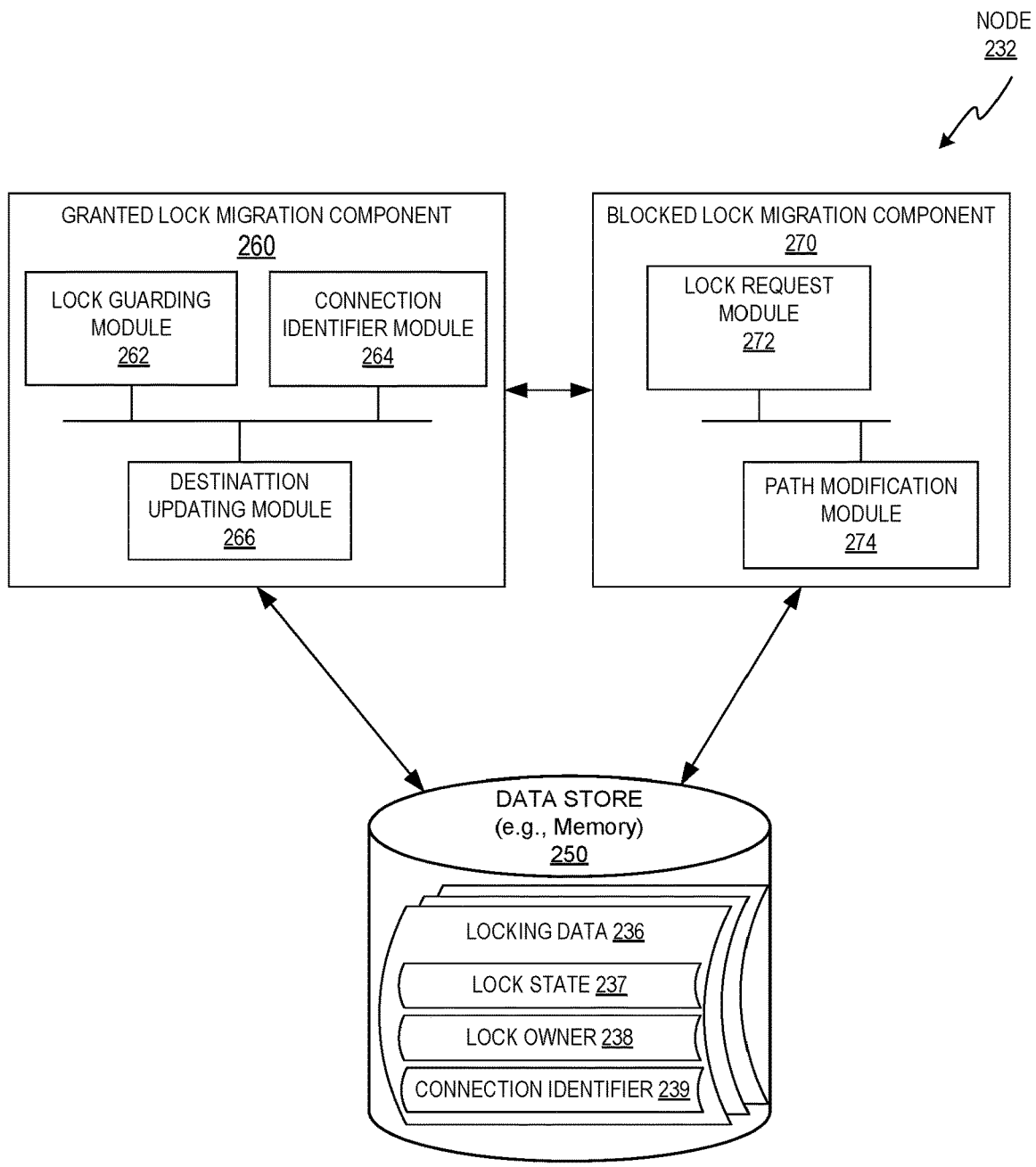
FIG. 2 depicts a high-level diagram of an example data storage node in accordance with one or more aspects of the present disclosure.

FIG. 2 depicts a block diagram of an exemplary node 232 that contributes to the distributed file system and supports the migration of locking information to a different node. Node 232 may be the same or similar to node 132B of FIG. 1, and may include a data store 250, a granted lock migration component 260, and a blocked lock migration component 270.

Data store 250 may store locking data 236 and may be associated with one or more processes running on node 232. Data store 250 may be volatile or non-volatile memory, flash storage, disk, or other storage technology. Locking data 236 may be similar to locking data 136B of FIG. 1 and may include a lock state 237, a lock owner 238, and a connection identifier 239.

Lock state 237 may indicate the state or status of a file system object lock represented by locking data 236. Lock state 237 may indicate a lock is in an unlocked state, a locked state, or a blocked state. Lock state 237 may also indicate the type of lock such as whether the lock is a shared lock or an exclusive lock or whether it restricts read access, write access, execute access or a combination thereof.

Lock owner 238 may indicate the owner that initiated a request for a lock on the file system object. The lock owner may include identification information associated with a computing process or computing device that requested or initiated the file system object lock. The identification information may include or be associated with an identifier of the process (e.g., process identifier (PID)), an account (e.g., user account, system account), a device name (e.g., computer name, group name), a network address or identifier (e.g., IP address, MAC address, port number) or a combination thereof. The computing process may be an application process or a system process that is accessing or attempting to access the file system object. The computing process may be running on a remote device (e.g., computing device 110 over a network) or on the local device (e.g., node 232). In one example, identification information associated with the lock owner 238 may be provided by a virtual file system (VFS) operating on a remote or local computing device. The distributed file system may use lock owner 238 in conjunction with connection identifier 239 to determine whether a file system object is subject to conflicting locks.

Connection identifier 239 may include information that identifies a connection between a client process and node 232 and may include two portions. A first portion may be a connection portion that relates to one or more connections (e.g., physical connections, socket connections) between two devices and a second portion may be a process portion that relates to a process using the connection portion. The combination of the connection portion and the process portion of connection identifier 239 may be used to identify a mount (e.g., mount point) through which an application process may request a lock on a file system object.

The connection portion of connection identifier 239 may be between node 232 and a computing device within the distributed file system (e.g., another node) or between node 232 and a computing device external to the distributed file system. The connection portion may correspond to one or more separate connections (e.g., socket connections) that share the same identification information (e.g., global label) and may be treated as a connection portion that may be shared by multiple processes running on the computing device. For example, when the computing device is another node there may be a rebalance process and a mount process that share the same connection portion to node 232. The connection portion may uniquely identify the one or more connections between devices and may remain constant or persist across different instances of the connections. For example, when a connection terminates (e.g., disconnected, failed) and a new connection may be established between the same devices and the connection portion of the connection identifier may remain the same. In one example, the connection portion of connection identifier 239 may be based on a name common to the one or more connections, a process that manages the connection (e.g., daemon), or a combination thereof.

The process portion of connection identifier 239 may relate to a computing process running on a device remote from node 232. The process portion may be similar to the lock owner in that it may identify a process but the lock owner and process portion may each identify a different process on the remote machine. For example, lock owner 238 may identify an application process (e.g., text editor) that initiated a lock on a file system object and the process portion of the connection identifier may identify an underlying computing process, such as a storage access process (e.g., mount process) that provides the application process access to the file system object. The process portion may use an identifier (e.g., Universally Unique Identifier (UUID)) that uniquely identifies a process running on the remote device and distinguishes the process from other processes running on any other devices (e.g., node device) associated with some or all of the distributed file system (e.g., unique across a volume or across all volumes).

Node 232 may include a granted lock migration component 260 and a blocked lock migration component 270. These components may interoperate to migrate locking data from a file system object from node 232 to another node within the distributed file system. Components 260 and 270 may be a part of a rebalancing process (e.g., daemon) that runs on node 232 and may be initiated when the rebalancing process is balancing files system objects and locking data across one or more nodes. In one example, components 260 and 270 may be initiated after a rebalancing process has successfully migrated a file system object and may handle transferring one or more elements of locking data 236 corresponding to one or more granted or blocked locks corresponding to the migrated file system object. Granted lock migration component 260 may migrate locking data 236 when locking data 236 is associated with a locked state and blocked lock migration component 270 may handle locking data 236 when locking data 236 is associated with a blocked state.

Granted lock migration component 260 may include a lock guarding module 262, a connection identifier module 264, and a destination updating module 239. Lock guarding module 262 may acquire a guard on locking data 236 to prevent a change to lock state 237 during the migration of locking data from node 232 to a different node. The guard on locking data 236 may be initiated by a client and may be acquired by node 232 or by one of the other nodes of the distributed file system. The guard may be associated with a meta-lock or a lock on a file system object lock and may be implemented with a flag (e.g., bit) that is checked before alternating locking data 236. In one example, the guard may prevent changes to all portions of locking data 236 by a computing process other than the computing process performing the migration (e.g., rebalance process). In another example, the guard may prevent changes to lock state 237 by any and all computing processes but may permit changes to connection identifier 239 by one or more computing processes (e.g., a rebalancing processes on node 232 and the destination node). A single guard may protect one or more elements of locking data associated with a granted lock without protecting the elements of locking data associated with blocked locks. In one example, a single guard may prevent changes to all elements of locking data associated with granted locks of a particular file system object. In another example, a single guard may prevent changes to a specific element of locking data (e.g., granted lock) without protecting other elements of locking data associated with the same file system object.

Connection identifier module 264 may determine information for a connection or process associated with the destination node and may modify connection identifier 239 to include this information before, during, or after the migration. As discussed above, the connection identifier may be included within locking data 236 and may identify a connection between a client computing device and the node storing the locking information. When locking data 236 is migrated to a new node the locking information may be updated or modified to identify a connection between the client computing device and the new node.

Destination updating module 239 may interact with connection identifier module 264 and may transfer locking data 236 to another node (e.g., destination node). Destination updating module 239 may modify locking data 236 before, during, or after transferring locking data 236 to another node. In one example, destination updating module 239 may receive a newly constructed connection identifier from connection identifier module 264 and may modify the connection identifier 239 within locking data 236 prior to transferring locking data 236 to a destination node. In another example, destination updating module 239 may transfer locking data 236 and the newly constructed connection identifier to a destination node and the destination node may manipulate locking data 236 to replace connection identifier 239 with the newly constructed identifier.

Blocked lock migration component 270 may handle migrating locking data 236 when the locking data is associated with a blocked lock. Blocked lock migration component 270 may use one or more of the modules of granted lock migration component (e.g., destination updating module 239) and may include a lock request module 272 and a path modification module 274.

Lock request module 272 may identify and analyze a lock request associated with locking data 236. A lock request may be a message initiated by a computing device to acquire a lock on a file system object. In one example, a computing device may function as a client of the distributed file system and may initiate a lock by transmitting a lock request to a node within the distributed file system. The lock request may identify the requestor (e.g., potential lock owner) and may be received over a connection represented by connection identifier 239.

Path modification module 274 may receive information identifying a lock request from lock request module 272 and may identify a request path for the lock request. The request path may identify one or more nodes of the distributed file system that have forwarded the lock request. As discussed above, the lock request may be received by a node of the distributed file system and may be subsequently transferred or forwarded to one or more other nodes or node modules (e.g., processes) before reaching node 232. The request path may include information that identifies one or more of the nodes that have forwarded the request. When the distributed file system includes a hierarchy of nodes, the request path may include information for a node at each of one or more levels. Identifying the nodes that have forwarded the request may be advantageous because in may enable a destination node that subsequently acquires the lock (e.g., node 132C) to transmit a message back to the computing device that initiated the lock request (e.g., computing device 110). The message may indicate information related to locking data 236, such as the lock state (e.g., granted, blocked), lock owner 238, connection identifier 239, other information (e.g., informational, warning, or error message), or a combination thereof.

Path modification module 274 may modify the request path to be associated with the destination node by unwinding and rebuilding the request path. Request path may initially include information identifying node 232, and path modification module 274 may modify the request path to replace node 232 with the destination node. The modification my involve unwinding the original request path by contacting one or more of the nodes that have forwarded the lock request and having them remove references to the lock request. Rebuilding the request path may involve contacting the one or more nodes associated with the modified request path to include a new reference to the modified lock request. This may enable a lock request to be blocked on node 232 and transferred to the destination node, where the lock request may be subsequently granted. The destination node may then use the modified request path and the one or more nodes with the new references to contact the computing device that initiated the lock request.

Path modification module 274 may interact with destination updating module 239 to transfer the modified request path to another node (e.g., destination node). Destination updating module 239 may modify the request path before, during, or after transferring locking data 236 to another node. In one example, locking data 236 may include the request path and destination updating module 239 may modify locking data 236 to include a newly constructed request path prior to transmitting locking data 236 to the destination node. In another example, destination updating module 239 may transfer locking data 236 and a newly constructed connection identifier to a destination node and the destination node may manipulate locking data 236 to update locking data 236 with the newly constructed identifier.

Figure 3:
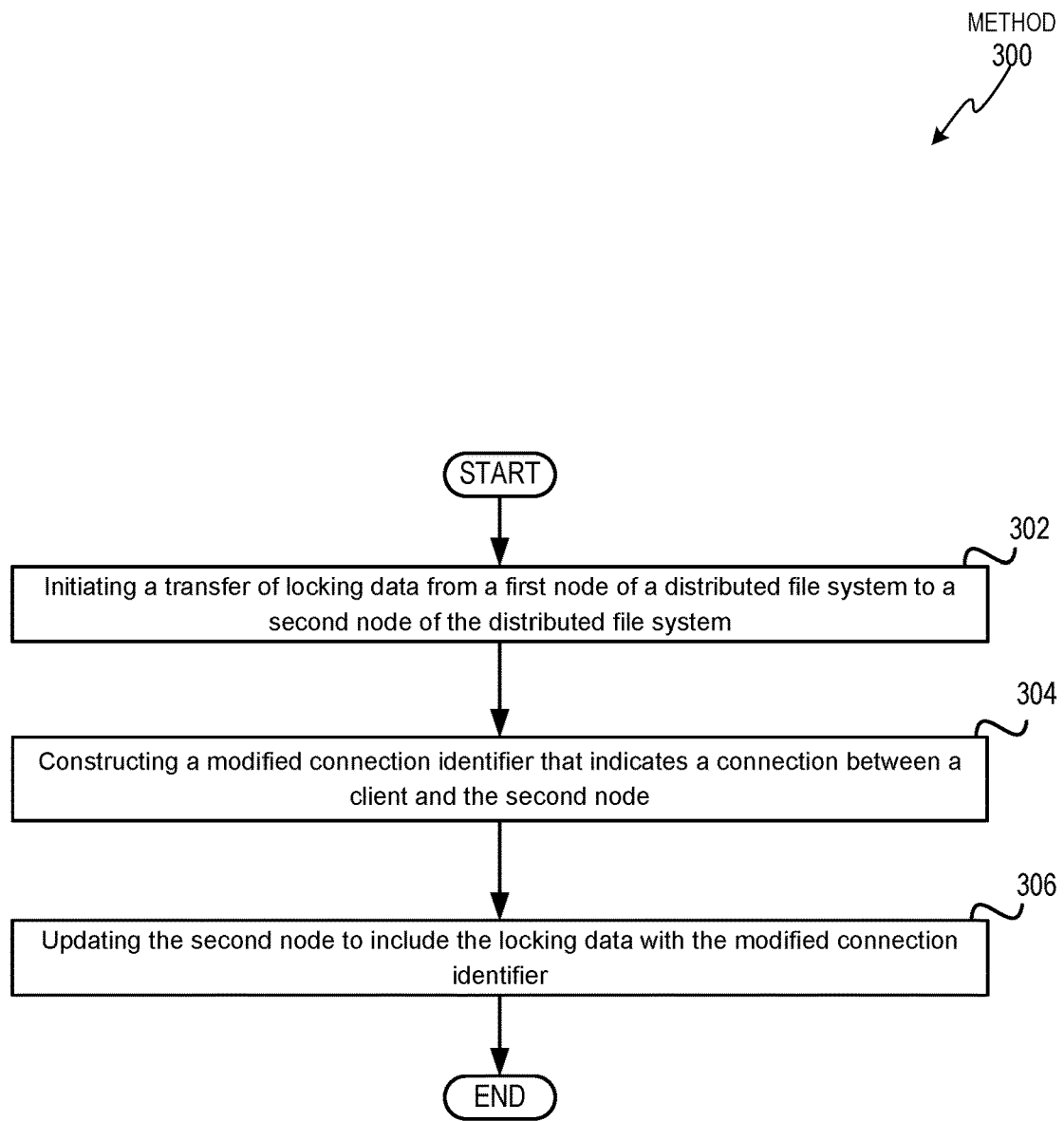
FIG. 3 depicts a flow diagram of an example method for transferring a lock on a file system object from a first node to a second node of a distributed file system in accordance with one or more aspects of the present disclosure.
Figure 4:
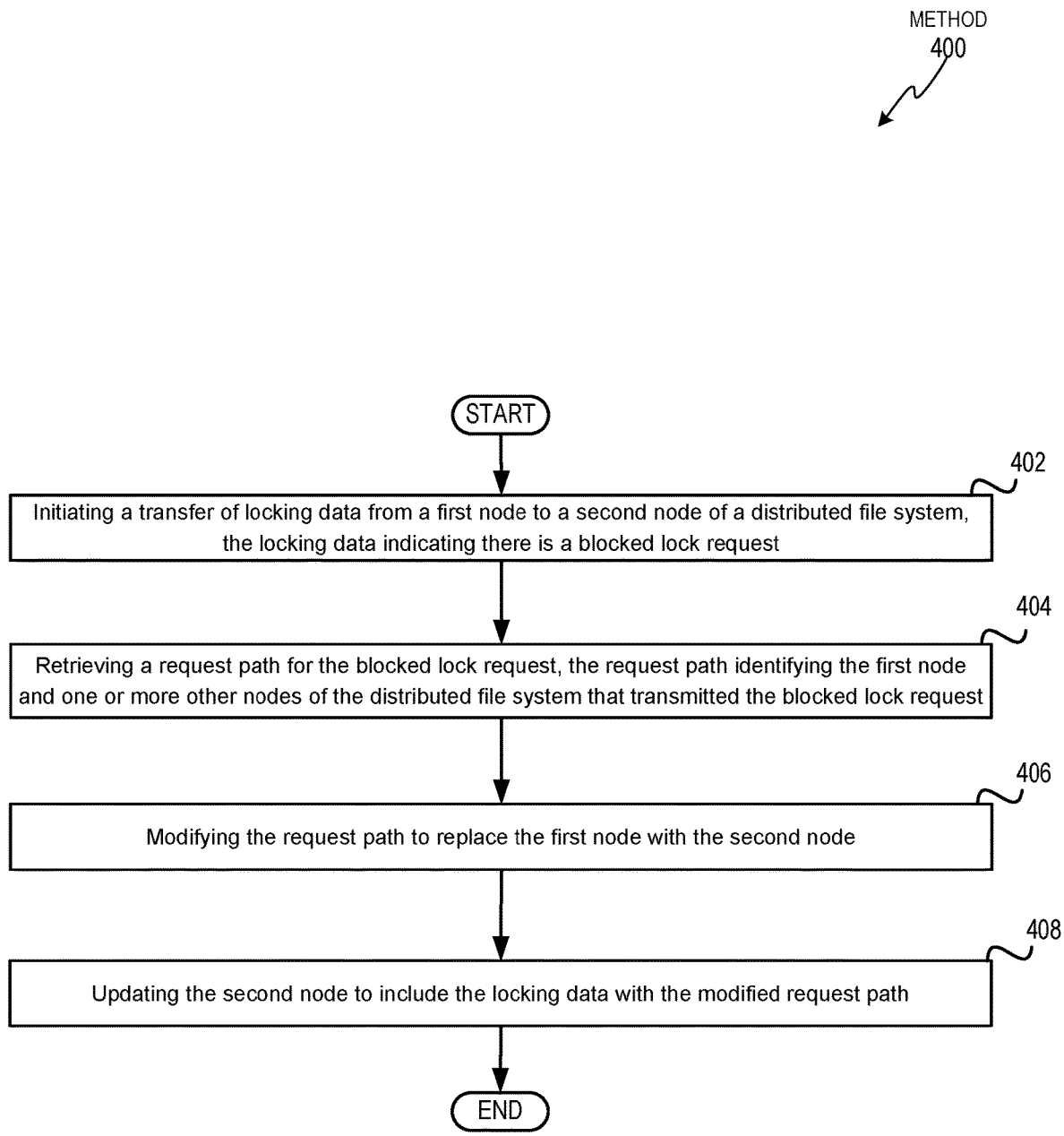
FIG. 4 depicts a flow diagram of another example method for transferring a blocked lock request from a first node to a second node of a distributed file system, in accordance with one or more aspects of the present disclosure.

FIGS. 3 and 4 depict flow diagrams for illustrative examples of methods 300 and 400 for migrating locking data associated with a file system object within a distributed file system. Method 300 may handle locking data associated with a granted lock and method 400 may handle locking data associated with a blocked lock. Methods 300 and 400 may be performed by processing devices that may comprise hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by nodes 132A-C and 232 as shown in FIGS. 1 and 2 respectively.

Referring to FIG. 3, method 300 may be performed by processing devices of a computing device (e.g., node 232) and may begin at block 302. At block 302, the processing device may initiate a transfer of locking data from a first node of a distributed file system to a second node of the distributed file system. The locking data may be associated with a lock on a file system object and comprise a connection identifier indicating a connection between the client and the first node. The client may have been granted a lock on the file system object and the transfer of locking data from the first node to the second node may occur without removing the lock and without contacting the client. In one example, the transfer of the locking data for the file system object from the first node to the second node may occur after migrating content of the file system object from the first node to the second node.

The locking data may include a lock owner, a lock state and the modified connection identifier. The modified connection identifier may include identification information for the client connection and a client process. In one example, the processing device may acquire a guard of the locking data on the first node to prevent a change to the lock state of the locking data during the transfer of the locking data from the first node to the second node. The acquisition of the guard on the locking data for the file system object may occur after content of the file system object is migrated.

At block 304, the processing device may construct a modified connection identifier that indicates a connection between a client and the second node. The process of modifying the connection identifier may involve retrieving the locking data from the first node, wherein the locking data includes a connection identifier for a connection providing a client access to the first node. The process may also involve identifying an existing connection that provides the client access to the second node without contacting the client and updating the locking data to include a connection providing the client access to the second node. The connections between the client and the first node and the client and the second node may exist prior to initiating the transfer of the locking data. In one example, the connections to both the first node and second node may exist at the time the locking data is transferred to the second node. In another example, the connections to the first node and second node may not both exist at the time the locking data is transferred and the connection to the first node may have been terminated leaving only the connection to the second node. In another example, there may be a third connection and the client connection indicated by the modified connection identifier may be between the and a third node that provides the client access to the second node. In this latter example, the first node, the second node, and the third node may be separate node devices.

At block 306, the processing device may update the second node to include the locking data with the modified connection identifier. Updating the second node to include the locking data may involve storing the locking data with the modified connection on the second node. In one example, updating the second node may involve migrating the locking data from an export process (e.g., file exporting process) running on the first node to an export process (e.g., file exporting process) running on the second node. Both the construction of the modified connection identifier and the updating of the second node to include the modified connection identifier may be performed without notifying the client (e.g., application process that requested the lock).

Responsive to completing the operations described herein above with references to block 306, the method may terminate.

Referring to FIG. 4, method 400 may be performed by processing devices of a server device or a client device and may begin at block 402. At block 402, the processing device may initiate a transfer of locking data from a first node to a second node of a distributed file system and the locking data may indicate there is a blocked lock request. A blocked lock request may be a message initiated by a lock owner to acquire a lock on a file system object. In one example, a computing device may function as a client of the distributed file system and may initiate the acquisition of a lock by transmitting a lock request to a node within the distributed file system. When the distributed file system is unable to grant the lock request the lock request may remain or persist as a blocked lock request (e.g., blocked lock).

At block 404, the processing device may retrieve a request path for the blocked lock request. The request path may identify the first node and one or more other nodes of the distributed file system that have transmitted the blocked lock request. As discussed above, the lock request may be received by a node of the distributed file system and it may be subsequently transferred or forwarded to one or more other nodes or node modules (e.g., processes) before reaching node 132. The request path may identify one or more of the nodes that have forwarded the request. When the distributed file system includes a hierarchy of nodes, the request path may include information for a node at each of one or more levels.

At block 406, the processing device may modify the request path to replace the first node with the second node. Request path may initially include a first node and before, during, or after the locking data is migrated to the destination node the request path may be modified to include the destination node. Modifying the request path may also involve the processing device to update one or more nodes identified by the request path to remove information (e.g., references) to the blocked lock request and to update one or more nodes identified by the modified request path to include information related to the blocked lock request. This may enable a lock request that is blocked on the first node to be transferred to the destination node, where it may be subsequently granted. The destination node may then use the modified request path to contact the computing device that initiated the lock request.

At block 408, the processing device may update the second node to include the locking data with the modified request path. Updating the second node to include the modified request path may involve migrating the locking data from a server process (e.g., export process) running on the first node to a server process running on the second node. Both the construction of the modified connection identifier and the updating of the second node to include the modified connection identifier may be performed without notifying the client, which may be the application process that requested the lock. Responsive to completing the operations described herein above with references to block 408, the method may terminate.

In another example of method 400, distributed file system may receive new lock requests for a migrated file system object while the locking data is being transferred. The new lock requests may be transmitted from a client to the first node as opposed to the second node where the locking data is being transferred. When this situation arises, the processing device of the distributed file system may add the new lock request to a queue and delay processing the new lock request until the transfer of the locking data is complete. Once completed, the processing device may notify the client and indicate that the second node should be contacted. In response the client may resubmit the lock request to the second node, which may process the new lock request and future lock requests for the file system object.

Figure 5:
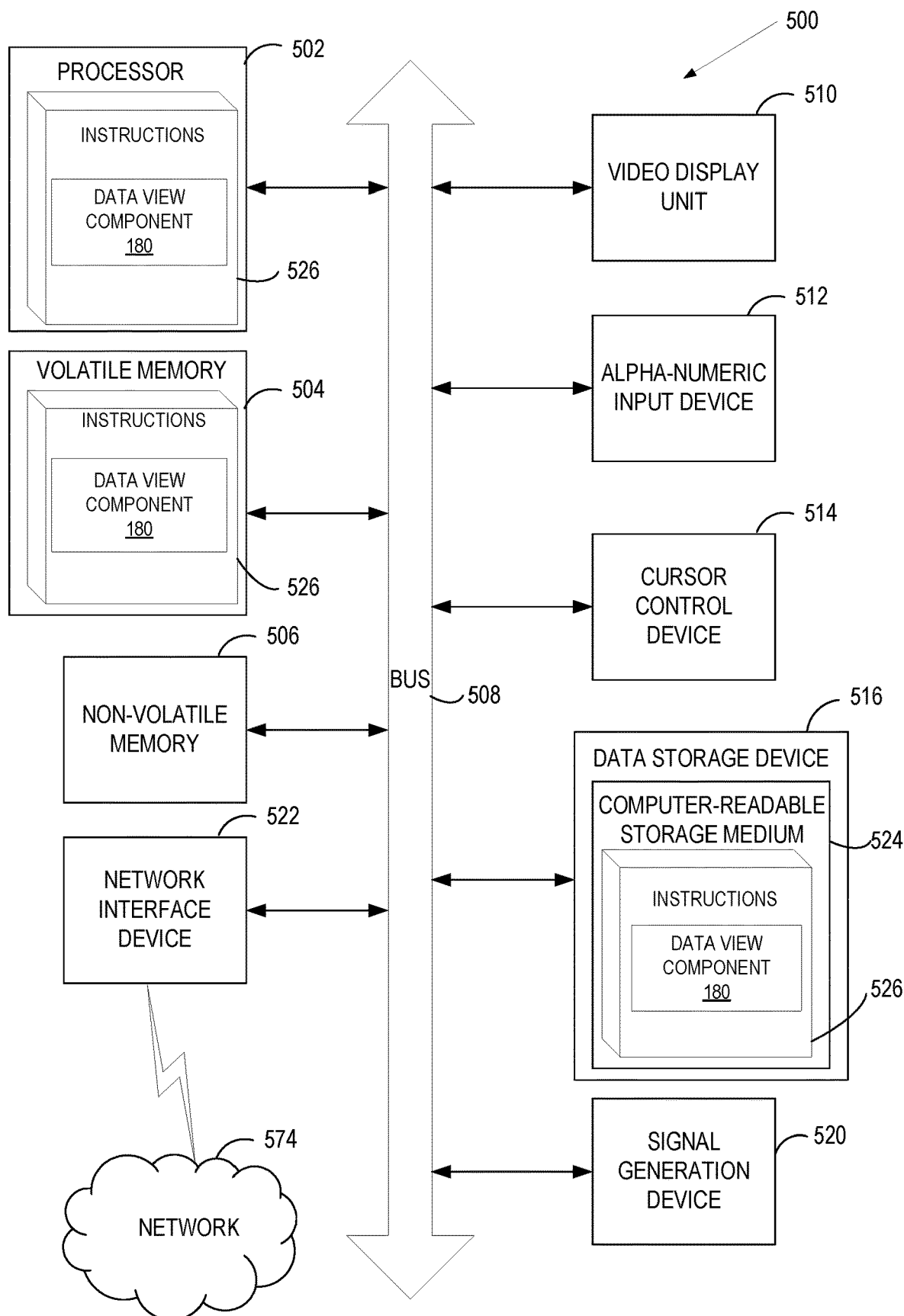
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to example system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processor 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processor 502 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding granted lock migration component 260 (not shown) or blocked lock migration component 270 (not shown) of FIG. 1 implementing methods 300 or 400.

Instructions 526 may also reside, completely or partially, within volatile memory 504 and/or within processor 502 during execution thereof by computer system 500, hence, volatile memory 504 and processor 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "receiving," "transmitting," "arranging," "combining," "generating," "inspecting," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    initiating, by a processing device, a transfer of locking data from a first node of a distributed file system to a second node of the distributed file system, wherein the locking data is associated with a file system object and comprises a connection identifier indicating a connection between the first node and a client, and wherein the client comprises a lock on the file system object;
    constructing, by the processing device after initiating the transfer, a modified connection identifier without contacting the client and without removing the lock, wherein the modified connection identifier indicates a connection between the client and the second node; and
    updating, by the processing device, the second node to include the locking data with the modified connection identifier.

2. The method of claim 1, further comprising granting, by the first node, the lock on the file system object to the client.

3. The method of claim 1, wherein updating the second node to include the locking data comprises a transfer of the locking data from an export process running on the first node to an export process running on the second node.

4. The method of claim 1, wherein the locking data associated with the file system object comprises a lock owner, a lock state, and the modified connection identifier, and wherein the modified connection identifier comprises identification information for the connection between the client and the second node and identification information for an application process running on the client that requested the lock.

5. The method of claim 1 further comprising, identifying an existing connection that provides access of the client to the second node without contacting the client.

6. The method of claim 1, wherein constructing the modified connection identifier and updating the second node to include the modified connection identifier is performed without notifying the client.

7. The method of claim 1 further comprising, acquiring a guard of the locking data on the first node to prevent a change to a lock state of the locking data during the transfer of the locking data from the first node to the second node.

8. The method of claim 1, wherein the transfer of the locking data for the file system object from the first node to the second node occurs after transferring content of the file system object from the first node to the second node.

9. The method of claim 1 further comprising, receiving multiple lock requests for the file system object, wherein at least one of the multiple requests is granted and at least one of the multiple lock requests is blocked.

10. The method of claim 1, further comprising:
    receiving, at the first node, a lock request for the file system object during the transfer of the locking data; and
    processing, at the second node, the lock request after the updating the second node to include the locking data.

11. The method of claim 1, further comprising:
    initiating a transfer of additional locking data from the first node to the second node of the distributed file system, wherein the additional locking data is for the file system object and indicates there is a blocked lock request from a second client;
    retrieving a request path for the blocked lock request, the request path identifying the first node and one or more other nodes of the distributed file system that transmitted the blocked lock request;
    modifying the request path to replace identification information for the first node with identification information for the second node; and
    updating the second node and the one or more other nodes to reflect the modified request path.

12. The method of claim 11, wherein the transfer of the additional locking data from the first node to the second node occurs without removing the blocked lock request.

13. The method of claim 12, wherein the distributed file system comprises a hierarchy of nodes with one or more nodes at one or more levels, and wherein the request path for the blocked lock request comprises identification information for a node at each of the one or more levels.

14. A system comprising:
    a memory; and
    a processing device operatively coupled to the memory, the processing device to:
        initiate a transfer of locking data from a first node of a distributed file system to a second node of the distributed file system, wherein the locking data is associated with a file system object and comprises a connection identifier indicating a connection between the first node and a client, wherein the client comprises a lock on the file system object;
        construct, after the initiation of the transfer, a modified connection identifier without contacting the client and without removing the lock, wherein the modified connection identifier indicates a connection between the client and the second node; and
        update the second node to include the locking data with the modified connection identifier.

15. The system of claim 14, wherein the first node grants the lock on the file system object to the client.

16. The system of claim 14, wherein to update the second node to include the locking data comprises the processing device to transfer the locking data from an export process running on the first node to an export process running on the second node.

17. The system of claim 14, wherein the locking data associated with the file system object comprises a lock owner, a lock state, and the modified connection identifier, wherein the modified connection identifier comprises identification information for the connection between the client and the second node and identification information for an application process running on the client that requested the lock.

18. The system of claim 14, wherein the processing device is further to identify an existing connection that provides the client access to the second node without contacting the client.

19. A non-transitory machine-readable storage medium storing instructions that cause a processing device to:
    initiate a transfer of locking data from a first node of a distributed file system to a second node, wherein the locking data is associated with a file system object and indicates a first client comprises a lock on the file system object and a second client comprises a blocked lock request for the file system object;
    retrieve a request path for the blocked lock request, the request path identifying the first node and one or more other nodes of the distributed file system that transmitted the blocked lock request;
    modify the request path to replace identification information for the first node with identification information for the second node;

constructing a modified connection identifier without contacting the client and without removing the lock, wherein the modified connection identifier indicates a connection between the client and the second node; and update the second node to include the locking data with the modified connection identifier and the modified request path.

20. The non-transitory machine-readable storage medium of claim 19, wherein the processing device is further to update the one or more other nodes identified by the request path to remove information of the blocked lock request and to update one or more nodes identified by the modified request path to include information related to the blocked lock request.

* * * * *